Figure 1:
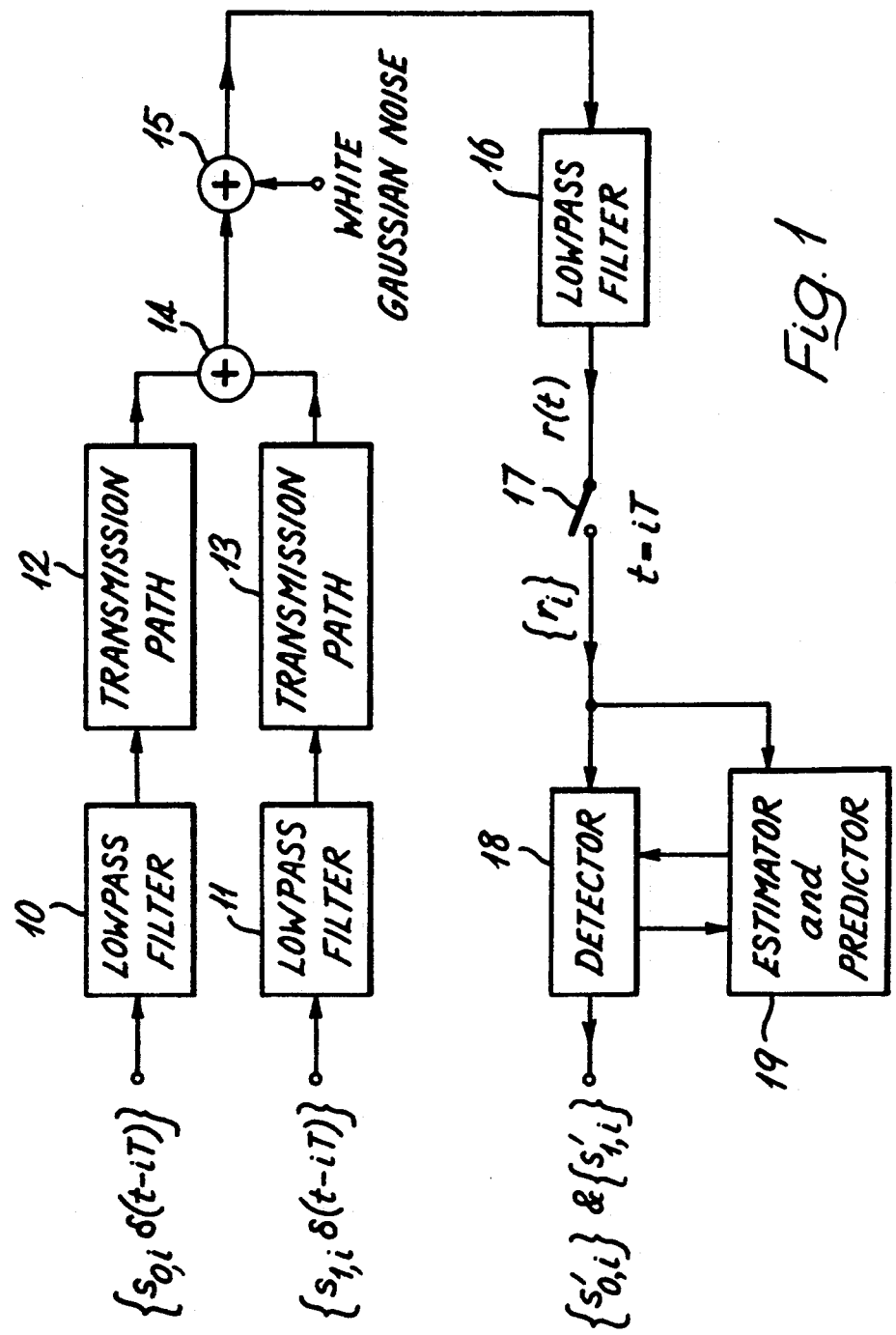

United States Patent [19]

Clark

[11] Patent Number: 5,005,188
[45] Date of Patent: Apr. 2, 1991

[54] CHANNEL ESTIMATION AND DETECTION FOR DIGITAL COMMUNICATION SYSTEMS

[75] Inventor: Adrian P. Clark, Loughborough, England

[73] Assignee: National Research Development Corporation, London, England

[21] Appl. No.: 373,211

[22] Filed: Jun. 29, 1989

Related U.S. Application Data

[62] Division of Ser. No. 38,351, Apr. 14, 1987, Pat. No. 4,862,483.

[30] Foreign Application Priority Data

Apr. 21, 1986 [GB] United Kingdom ............... 8609711

[51] Int. Cl.$^5$ ............................................ H04L 27/00
[52] U.S. Cl. ...................................... 375/94; 371/43; 375/101
[58] Field of Search ................... 371/43, 44, 45, 46, 371/30; 375/34, 75, 94, 96, 101, 102, 103

[56] References Cited

U.S. PATENT DOCUMENTS

| | | | |
|---|---|---|---|
| 4,527,279 | 7/1985 | Yashuda et al. | 371/46 |
| 4,578,800 | 3/1986 | Yashuda et al. | 371/46 |
| 4,656,648 | 4/1987 | Vallet | 375/94 |
| 4,675,871 | 6/1987 | Gordon et al. | 371/43 |
| 4,730,322 | 3/1988 | Pollara-Bozzola | 371/43 |
| 4,745,625 | 5/1988 | Eyuboglu | 371/43 |

FOREIGN PATENT DOCUMENTS

| | | |
|---|---|---|
| 0152947 | 8/1985 | European Pat. Off. |
| 2087198 | 5/1982 | United Kingdom |

OTHER PUBLICATIONS

A. P. Clark, "Modems for Cellular Mobile Radio", IEEE Colloquim on Digital Mobile Radio, London, 10/1985, pp. 861-866.

"Near-maximum Likelihood Detection Processes for Distorted Digital Signals", Radio & Electronic Engineer, vol. 48, No. 6, pp. 301-309, Jun. 1978.

"Detection of Digital Signals Transmitted over a Known Time-Varying Channel", A. P. Clark, et al., IEE Proc., vol. 128, Pt. E, No. 3, Jun. 1981, pp. 167-169.

"Channel Estimation for an HF Radio Link", A. P. Clark, et al., IEE Proc., vol. 128, Pt. F., No. 1, Feb. 1981, pp. 33-42.

*Primary Examiner*—Benedict V. Safourek
*Attorney, Agent, or Firm*—Cushman, Darby & Cushman

[57] ABSTRACT

The attenuation and phase change of a communication channel have to be estimated for near-maximum-likelihood detection and this presents severe difficulties where rapid fading occurs especially in communication between mobile stations in cellular radio. A number of vectors are stored which represent possible sequences of received data symbols and these vectors are expanded on receipt of each further digital sample. Costs, representing a measure of the likelihood that sequences are correct, the lower the cost the higher the likelihood, are then derived for each vector on the basis of stored prediction of channel performance. Next the earliest data symbols in the vector with lowest costs are output as detected symbols and then the vectors with lowest costs are selected for storage in place of the original vectors. New channel predictions are formed from channel estimates for the current sample and stored for use in the next iteration.

1 Claim, 3 Drawing Sheets

CHANNEL ESTIMATION AND DETECTION FOR DIGITAL COMMUNICATION SYSTEMS

This is a division of application Ser. No. 07/038,351, filed Apr. 14, 1987, now U.S. Pat. No. 4,862,483.

The present invention relates to estimating the attenuation and phase change of a communication channel where rapid fading occurs, and to near-maximum-likelihood detection based on the estimate of a channel.

In cellular mobile radio systems one of the most difficult problems in design which affects the modem at the base station is that the mobiles in a cell do not communicate directly with each other but only via the base station. As a result the modem receiver at the base station must carry out a process of estimation and detection on each individual received signal. These signals originate from different mobiles and occur in bursts. Thus there is a continuous process involving the appearance of new signals and the disappearance of existing signals. Furthermore, different signals fade independently and may therefore have widely differing levels. Serious Doppler shifts may also be experienced.

In a proposed system, frequency-division multiplexing is used, with carrier frequencies close to 900 MHz. Adjacent carrier frequencies are spaced at 25 kHz and, for every channel, full raised-cosine spectral shaping is used for the demodulated baseband signal at the receiver. A four-level (quaternary) quadrature amplitude modulated (QAM) signal is transmitted over each channel at 12,000 baud, to give a transmission rate of 24,000 bit/s per channel and a nominal bandwidth of 24 kHz. Thus interchannel interference is avoided. The bandwidth efficiency of the system, for signals transmitted from the mobiles to the base station, can now be doubled by permitting each channel to be used by two different mobiles. The independent random fading of the two signals occupying one channel enables these to be correctly detected at the receiver, for nearly all the time (see Clark, A. P. : "Digital modems for land mobile radio", IEE Colloquium on Digital Mobile Radio, London, pp 8/1-6, October 1985). In a cellular implementation of such a system, and with a sufficiently small size of a cell, it is possible to achieve both element-timing and frame-timing synchronisation of the signals transmitted by all mobiles in a cell. This enables the phase of the sampling instants in the modem receiver at the base station to be optimised simultaneously for all received signals, thus avoiding intersymbol interference in any individual sampled baseband signal.

Sufficiently accurate estimates corresponding to respective mobiles using a channel are difficult to obtain. For example, with a transmission rate of 12,000 bauds (elements/second) and a fading rate of 100 fades/second, there are typically 60 received samples between a peak and an adjacent trough in the fading of either of the two received signals. Thus, over a sequence of only some ten received signals considerable changes may take place in the characteristics of the channel in relation to each mobile. Furthermore, the changes are of too random a nature to be predicted reliably or accurately over more than about one quarter of a cycle of a fade. With such rapid and random variations, the estimator is inevitably much more sensitive to additive noise than is the corresponding estimator for a signal received over an HF radio link, where the maximum fading rate is typically not much more than one fade/second.

In HF radio links propagation takes place over various parallel alternative paths which are fading independently and introduce time delays whose values may differ by up to several times the duration of one signal element: as a result time-varying intersymbol interference occurs.

Near-maximum-likelihood detection is a known process and has been described, for example, by Clark, A. P., Harvey, J. D. and Driscoll, J. P.: "Near-maximum-likelihood detection processes for distorted digital signals", Radio and Electronic Engineer, Vol. 48, pp 301-309, June 1978. This detection process requires channel estimation which may be carried out in known ways: for example where fading occurs estimation may be as described by Clark, A. P. and McVerry, F. in "Channel estimation for HF radio link", IEE Proc., Vol. 128, Pt. F, No. 1, pp 33-42, February 1981.

The weakness of such estimation processes and the resultant detection is that they rely heavily on the correct detection of the data symbols at each sampling instant.

According to a first aspect of the present invention there is provided a method of near maximum likelihood detection in which a plurality of current channel estimates are formed at each sample instant, each current estimate being derived from the received signal at that instant.

Preferably a prediction of the channel for that instant which was derived at an earlier sample instant, is also used in forming each channel estimate when two received signals are to be detected.

When only one signal is perceived and in the absence of intersymbol interference, each current estimate is preferably derived from the received signal, without the use of the prediction of the channel for that instant.

According to a second aspect of the present invention there is provided a method of channel estimation and detection at a receiver comprising the steps, carried out for each of sample instants, of receiving over a communication channel a digital sample which is dependent on one or more of the most recently transmitted data symbols, expanding each of k stored first vectors, each representing a possible received sequence of n data symbols by means of n components, into m second vectors by adding for each of possible second vectors a further component representing a respective combination of data symbols which could be received at that sample instant and selecting as the m second vectors those of the possible vectors which represent the data-symbol sequences most likely to have been received as derived from the received sample and one of j stored predictions of the channel for the current sample instant, determining costs associated with each respective second vector, selecting that combination of data symbols represented by one component of a second vector having a relatively low cost as the detected data symbol, selecting k second vectors with relatively low cost and storing the selected vectors and their associated costs, and forming and storing j predictions of the channel for the next sample instant, the predictions representing the attenuation and phase change introduced into the signal by the channel, each prediction being formed from an estimate of the channel for the current sample, and a respective one of the j stored predictions of the channel for the current sample.

Since various possible sequences of received signals are stored, less reliance is placed on correctly detecting each symbol in forming the channel estimates. Thus the prediction of the channel and the detection of the data symbols are both likely to be improved, either in cellular mobile radio (with one or more received signals) or in HF radio.

The selected m second vectors may be those having the lowest distance quantities, and the costs associated with each respective second vector may be derived from the received sample, a stored cost associated with the first vector from which the second vector is derived and one of the stored predictions of the channel for the current sample instant.

When selecting k second vectors, the earliest component of each of these vectors is preferably omitted before storage.

Each received sample may represent one or more data symbols. When each sample represents two or more symbols, the first vectors each represent the same number of sequences of data symbols and this is also true of the second vectors. Preferably the number is the same for both first and second vectors. A number of data symbols equal to the number of sequences are selected as detected symbols.

Where each sample represents one data symbol only, each said combination of data symbols contains one symbol only.

If there is no intersymbol interference, the number of predictions j is preferably equal to the number of stored vectors k and each prediction is associated with a respective stored vector and its cost. Each new prediction to be associated with a new stored vector is derived from the estimate of the channel determined for the current sample and the stored prediction of the channel for that sample, associated with the stored vector from which the new vector is derived.

The number m of second vectors expanded from each first vector preferably varies with each first vector, the lower the cost associated with a first vector, the higher the number of second vectors derived from that first vector.

Preferably each possible data symbol is used in expanding each first vector to provide vectors from which the m second vectors are selected.

It is also advantageous to select the earliest component of that second vector with the lowest cost as the detected symbol.

The way in which the k new first vectors are selected from the second vectors may comprise firstly selecting all those second vectors which included the detected data symbols, and secondly selecting from the selected second vectors those with lowest costs.

Each channel prediction for the next sample instant may be formed from both the current sample and a respective one of the j stored predictions of the channel for the current sample.

The invention also includes apparatus equivalents of the methods of the first and second aspects of the invention.

Figure 2:
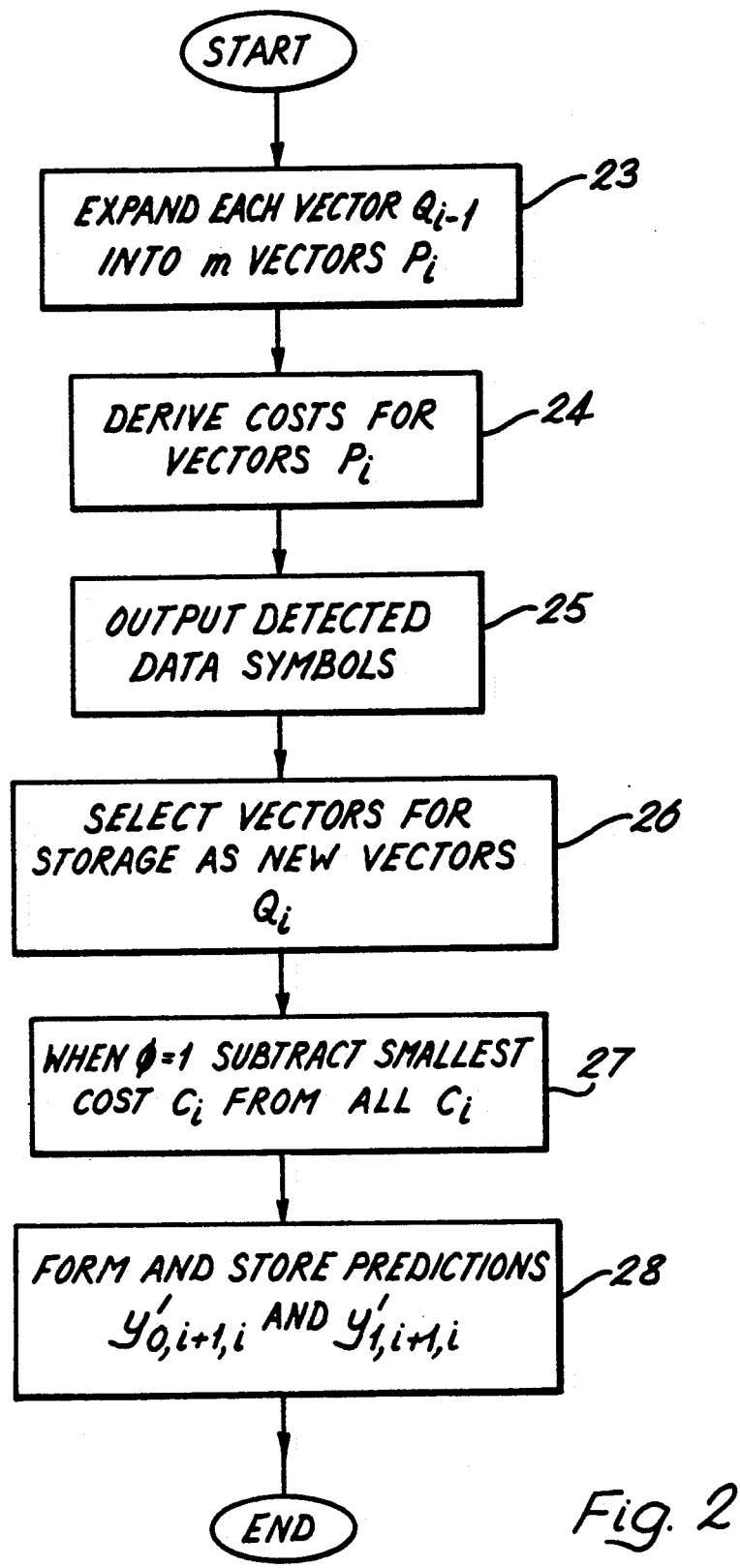
Figure 3:
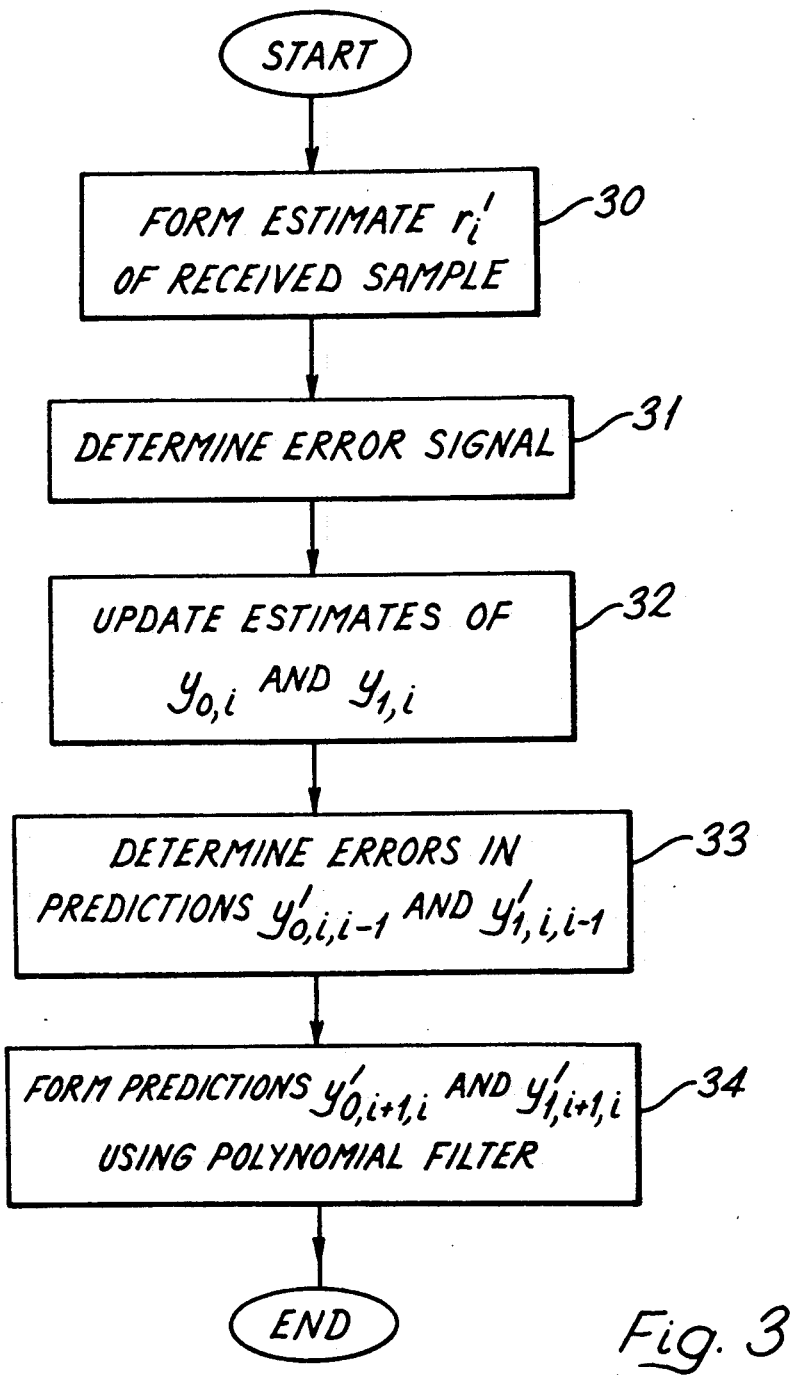

Certain embodiments of the invention will now be described with reference to the accompanying drawings, in which:

FIG. 1 is a block diagram of the communication links between two mobiles of a cellular radio system and the receiver of a base station in which the invention is employed, FIG. 2 shows an algorithm employed by the detector of FIG. 1, and FIG. 3 shows an algorithm employed by the estimator and predictor of FIG. 1, when there are two received signals.

The model shown in FIG. 1 relates to two mobiles which operate at the same carrier frequency, in a frequency-division multiplexed QAM mobile radio system, such as that described briefly above. The two transmission paths are shown at baseband. The following description of FIG. 1 first assumes that two signals are received but the arrangement is such that reception of one signal only is detected and then operation is modified as described later.

The two mobile stations include respective low pass filters 10 and 11 which represent band limiting carried out in the final stages of these stations. The input signals to the filters are represented by $s_{0,i} \delta(t-iT)$ and $s_{1,i} \delta(t-iT)$, respectively, where $s_{0,i}$ and $s_{1,i}$ are data symbols at the respective transmitters of the mobiles at time iT and $\delta(t-iT)$ is a unit impulse at time $t=iT$, T being the sampling interval. The data symbols $s_{0,i}$ and $s_{1,i}$ may be statistically independent and equally likely, in this embodiment, to have any of four possible values $\pm 1$ and $\pm j$ where $j=\sqrt{-1}$. In other examples of the invention the data symbols may have other possible values.

The signals from the filters 10 and 11 pass along transmission paths 12 and 13 which introduce the baseband equivalent of the Rayleigh fading which is likely to occur with a 900 MHz carrier in an urban environment. The two channels fade independently and the fading rate is typically up to around 100 fades a second. Each transmission path may also introduce a Doppler shift. The two paths are shown as combined at 14 which is equivalent to the combination which occurs in a base station receiver and stationary white Gaussian noise is shown added at 15 although in practice such noise would be introduced into each of the paths 12 and 13 and also in the input circuits of the base station receiver. The most important types of additive noise are likely to be co-channel and adjacent channel interference from other mobiles, rather than the white Gaussian noise shown in the idealised model of the system in FIG. 1.

The resultant signal is passed through a lowpass filter to give a bandlimited noisy baseband signal r(t) and sampled by a sampler 17 at times $t=iT$ to give samples $r_i$.

The resultant transfer function of the transmitter and receiver filters 10, 11 and 16 is raised-cosine in shape and such that, with the appropriate phase $\Delta$ in the sampling instants $iT+\Delta$, there is no intersymbol interference in the samples $r_i$, where $r_i = r(iT+\Delta)$. Thus, the received sample, at time $t=iT+\Delta$, is $$r_i = s_{0,i} y_{0,i} + s_{1,i} y_{1,i} + w_i$$

where $r_i$, $y_{0,i}$, $y_{1,i}$ and $w_i$ are complex valued. The lowpass filter 16 is such that the real and imaginary parts of the noise components $w_i$ are statistically independent Gaussian random variables with zero mean and fixed variance. The quantities $y_{0,i}$ and $y_{1,i}$ may vary quite rapidly with i and each represents the attenuation and phase-change introduced into the corresponding signal by the transmission path.

The sampler 17 is coupled to a detector 18 and an estimator and predictor 19 which together may be in the form of a programmed computer such as one or more microprocessors or signal processing integrated circuits, programmable read only memory and random access memory (RAM). The RAM stores k different n-component vectors $Q_{i-1}$ where $$Q_{i-1} = [q_{i-n}\ q_{i-n+1}\ \ldots\ q_{i-1}],\ \text{and}$$

each $q_i$ has two components $$[q_{0,i}\ q_{1,i}]$$

corresponding to the possible values of $s_{0,i}$ and $s_{1,i}$ and therefore has 16 different possible combinations. Typical values for k and n are 4 and 8 to 32, respectively. Each vector $Q_{i-1}$ represents a different possible pair of the sequences $$[s_{0,i-n}\ s_{0,i-n+1}\ \ldots\ s_{0,i-1}]$$

and $$[s_{1,i-n}\ s_{1,i-n+1}\ \ldots\ s_{1,i-1}]$$

Associated with each vector $Q_{i-1}$ is stored its cost $c_{i-1}$ (determined as described below), which is a measure of the likelihood that the vector is correct, the lower the cost the higher being the likelihood.

The RAM also stores k predictions $y'_{0,i,i-1}$ and $y'_{1,i,i-1}$ of $y_{0,i}$ and $y_{1,i}$, made at time $(i-1)T+\Delta$ for use at time $iT+\Delta$, one prediction for and associated with each vector $Q_{i-1}$. These predictions can be formed in many known ways, one of which is described later in relation to FIG. 3.

On receipt of the signal $r_i$, the detector 18 carries out an operation 23 (see FIG. 2) in which each vector $Q_{i-1}$ is expanded into m vectors $P_i$, where $$P_i = [q_{i-n}\ q_{i-n+1}\ \ldots\ q_i]$$

and m either has the same value, say 4, for each vector $Q_{i-1}$, or else m decreases as the cost of $Q_{i-1}$ increases. In each group of m vectors $P_i$ derived from any one vector $Q_{i-1}$, the first n components are as in the original $Q_{i-1}$ and the last component $q_i$ takes on m different values. The detector derives the "distance" $d_i$ for each possible combination of values $s'_{0,i}$ and $s'_{1,i}$ of the symbols $s_{0,i}$ and $s_{1,i}$ according to $$d_i^2 = |r_i - s'_{0,i}\ y'_{0,i,i-1} - s'_{1,i}\ y'_{1,i,i-1}|^2$$

where $|x|$ is the absolute value (modulus) of x, and the values of $y'_{0,i,i-1}$ and $y'_{1,i,i-1}$ used are those associated with the vector being expanded. The m vectors with the lowest distances for each vector $Q_i$ are then selected as the expanded vectors $P_i$ of that vector $Q_i$. The detector 18 next determines, in an operation 24, the cost associated with each vector $P_i$ from $$c_i = \phi c_{i-1} + |r_i - q_{0,i}y'_{0,i,i-1} - q_{1,i}y'_{1,i,i-1}|^2$$

where $\phi$ is a real-valued constant in the range 0 to 1, and the values of $y'_{0,i,i-1}$ and $y'_{1,i,i-1}$ used are those associated with the vector $Q_{i-1}$ from which the vector $P_i$ was derived. The quantity $c_{i-1}$ is the cost of this vector $Q_{i-1}$, such that $$c_{i-1} =$$

-continued $$\sum_{h=1}^{i} \phi^{h-1}\ |r_{i-h} - q_{0,i-h}y'_{0,i-h,i-h-1} - q_{1,i-h}y'_{1,i-h,i-h-1}|^2$$

It is assumed that transmission began at time t=0, so that $$q_{0,i} = q_{1,i} = s_{0,i} = s_{1,i} = 0$$

for $i < 0$. The nearer $\phi$ approaches to zero, the smaller is the effect of earlier costs on $c_i$, thus reducing the effective memory in $c_i$.

In an operation 25 the detector 18 determines the vector $P_i$ which has the lowest associated cost and outputs as detected values $S'_{0,i-m}$ and $S'_{1,i-n}$, the values $q_{0,i-n}$ and $q_{1,i-n}$ given by the component $q_{i-n}$ of this vector.

Any vector $P_i$ whose first component $q_{i-n}$ differs in value from that of the above $q_{i-n}$ is then discarded (operation 26), and from the remaining vectors $P_i$ (including that from which $s_{0,i-n}$ and $s_{1,i-n}$ were detected) are selected the k vectors having the smallest costs $c_i$. The first component $q_{i-n}$ of each of the k selected vectors $P_i$ is now omitted (without changing its cost) to give the corresponding vectors $Q_i$, which are then stored, together with the associated costs $c_i$, ready for the next detection process. The discarding of the vectors $P_i$, just mentioned, is a convenient method of ensuring that the k stored vectors $Q_i$ are always different, provided only that they were different at the first detection process, which can easily be arranged. To prevent now a possible overflow in the value of $c_i$, over a long transmission in the case where $\phi = 1$, the detector 18 subtracts the value of the smallest $c_i$ from each $c_i$ in an operation 27, after the selection of the k vectors $Q_i$, so that the smallest cost is always zero.

The detector 18 will be recognised from the operations 23 to 26 as being a near-maximum-likelihood detector such as is described in the above mentioned paper by Clark, Harvey and Driscoll when $\phi = 1$ except that different values of the predictions $y'_{0,i,i-1}$ and $y'_{1,i,i-1}$ are used in expanding the vectors $Q_{i-1}$ and deriving the costs for the vectors $P_i$ for each such vector.

Where $k = 4$, m may for example have the values 4, 3, 2 and 1, respectively, for the four $Q_{i-1}$, when arranged in the order of increasing costs and starting with the lowest cost vector. Thus, on the receipt of $r_i$, the first, second, third and fourth vectors $Q_{i-1}$ are expanded into four, three, two and one vectors $P_i$, respectively. There are now ten vectors $P_i$, from which are selected four vectors $Q_i$, as previously described. Generally $\phi$ is set to unity since this value appears to give the best performance.

In a final operation 28 of FIG. 2 new predictions $y'_{0,i+1,i}$ and $y_{1,i+1,i}$ are found by the estimator and predictor 19 and stored; one pair of predictions is found for, and then associated with, each stored vector. The estimates from which these predictions are derived can be determined in any of several known ways, for example the gradient or steepest descent algorithm described in the above mentioned paper by Clark and McVerry. This algorithm which is performed for each stored vector is now briefly described in conjunction with FIG. 3.

First an operation 30 is carried out to form an estimate $r'_i$ of the received sample $r_i$ using $$r'_i = q_{0,i} y'_{0,i,i-1} + q_{1,i} y'_{1,i,i-1}$$

where $q_{0,i}$ and $q_{1,i}$ are given by the particular vector $Q_i$, and then the error signal is found in an operation 31

$$e_i = r_i - r'_i$$

Next the estimator in 19 derives updated estimates of $y_{0,i}$ and $y_{1,i}$ in an operation 32 using equations $$y'_{0,i} = y'_{0,i,i-1} + b e_i (q_{0,i})^*$$

and $$y'_{1,i} = y'_{1,i,i-1} + b e_i (q_{1,i})^*$$

where b is an appropriate small positive real-valued constant, and $(q_{0,i})^*$ and $(q_{1,i})^*$ are the complex conjugates of $q_{0,i}$ and $q_{1,i}$, respectively. Errors in the predictions $y'_{0,i,i-1}$ and $y'_{1,i,i-1}$ are then found (operation 33) from $$\epsilon_{0,i} = y'_{0,i} - y'_{0,i,i-1} = b e_i (q_{0,i})^*$$

and $$\epsilon_{1,i} = y'_{1,i} - y'_{1,i,i-1} = b e_i (q_{1,i})^*$$

respectively.

Finally in an operation 34 the predictor in 19 forms the predictions $y'_{0,i+1,i}$ and $y'_{0,i+1,i}$ which are given by the appropriate least-squares fading-memory polynomial filter as described in Table 1 and shown in the paper by Clark and McVerry. These predictions are associated with the given vector $Q_i$ and normally differ from the predictions associated with any other vector $Q_i$.

TABLE 1

| Degree of polynomial | One-step prediction at time $t = iT + \Delta$ |
|---|---|
| 0 | $y'_{0,i+1,i} = y'_{0,i,i-1} + (1 - \theta)\epsilon_{0,i}$ |
| 1 | $y'_{0,i+1,i} = y'_{0,i,i-1} + (1 - \theta)^2 \epsilon_{0,i}$ |
|   | $y'_{0,i+1,i} = y_{0,i,i-1} + y''_{0,i+1,i} + (1 - \theta^2)\epsilon_{0,i}$ |
| 2 | $y'''_{0,i+1,i} = y'''_{0,i,i-1} + 0.5(1 - \theta)^3 \epsilon_{0,i}$ |
|   | $y''_{0,i+1,i} = y''_{0,i,i-1} + 2y'''_{0,i+1,i} + 1.5(1 - \theta)^2(1 + \theta)\epsilon_{0,i}$ |
|   | $y'_{0,i+1,i} = y'_{0,i,i-1} + y''_{0,i+1,i} - y'''_{0,i+1,i} + (1 - \theta^3)\epsilon_{0,i}$ |

$\theta$ is an empirical constant and typically has the value 0.9.

The polynomial filter is usually implemented by operations in the computer forming the predictor in 19, or by constructing a hardware filter based on FIG. 5 of the paper by Clark and McVerry. The terms $y''_{0,i+1,i}$ and $y'''_{0,i+1,i}$ are functions of the first and second derivatives of $y'_{0,i+1,i}$ with respect to time and are considered in Morrison, N.: "Introduction to sequential smoothing and prediction", McGraw-Hill, 1969, and can be used to improve the accuracy of $y'_{0,i+1,i}$. Relationships, exactly corresponding to those of Table 1 also hold for $y'_{1,i+1,i}$ and its time derivatives.

The operation 32 is not required in practice since $\epsilon_{0,i}$ and $\epsilon_{1,i}$ are found without using the updated estimates, but this operation is mentioned to show more clearly how prediction is carried out since in Morrison's paper prediction is based on measurements not estimates.

When one signal only is received, that is by way of either the transmission path 12 or the transmission path 13, the estimator in 19 switches to another algorithm. The received sample at time $t = iT + \Delta$ is now $$r_i = s_{0,i} y_{0,i} + w_i$$

The required estimate of $y_{0,i}$ is now given by $$s_{0,i}^{-1} r_i = y_{0,i} + s_{0,i}^{-1} w_i$$

Thus, with the correct detection of $s_{0,i}$, $(s'_{0,i})^{-1} r_i$ is the maximum-likelihood estimate of $y_{0,i}$ from $r_i$ and is an unbiased estimate. The error in the one-step prediction $y'_{0,i,i-1}$ is now taken as $$\epsilon_{0,i} = (s'_{0,i})^{-1} r_i - y'_{0,i,i-1}$$

which is used in the appropriate prediction algorithm of Table 1 to give $y'_{0,i+1,i}$. There is no need to use the gradient algorithm, and the estimate of $y_{0,i}$ is no longer a function of the prediction $y'_{0,i,i-1}$, leading to a more stable system.

Again, the technique of combined estimation and detection, previously described, where there are several stored vectors $Q_i$, can be used with advantage here, $(s'_{0,i})^{-1}$ in the last equation being now replaced by $q_{0,i}^{-1}$ where $q_{0,i}$ is given by the corresponding vector $Q_i$.

Another example of the use of the invention is now given and relates to HF radio. In this application one symbol only is transmitted at a time but because of intersymbol interference due to different propagation times over various parallel paths the received signal $r_i$ is now given by $$r_i = s_i y_{0,i} + s_{i-1} y_{1,i} + \ldots + s_{i-g} y_{g,i} + w_i$$

where $y_{0,i} \ldots y_{g,i}$ represents the sampled impulse response of the HF channel and $w_i$ again represents a sample of Gaussian noise. In this application FIG. 1 can be regarded as modified by the omission of the filter 11, the transmission path 13 and the combining operation 14.

Each of the components $q_{i-h}$ of the n-component vectors $Q_{i-1}$ has only one component $q_{0,i}$ and therefore each $Q_{i-1}$ represents only one sequence of possible data-symbol values. Also, instead of there being just two estimates $y'_{0,i}$ and $y'_{1,i}$ and two predictions $y'_{0,i,i-1}$ and $y_{1,i,i-1}$, there are now g+1 estimates $y'_{0,i}, y'_{1,i}, \ldots, y'_{g,i}$ and g+1 predictions $y'_{0,i,i-1}, y'_{1,i,i-1}, \ldots, y'_{g,i,i-1}$.

Each of these predictions may be formed in the way described above in connection with FIG. 3. Maximum likelihood detection in HF radio is described in Clark A. P., and Asghar, S. M., "Detection of digital signals transmitted over a known time-varying channel IEE Proc., Pt. F, Vol. 128, No. 3; pp 167–174 June 1981.

In H.F. radio each channel estimate is not associated with one stored vector only; for example j estimates may be used where k (the number of stored vectors)>j. The j estimates are respectively associated with the j stored vectors of lowest cost which requires that after predicting $y'_{0,i+1,i}$ (that is the prediction made at time $iT + \Delta$ for use at time $(i+1)T + \Delta$ from the received signal and a previous prediction $y'_{0,i,i-1}$ associated with respective stored vectors, the new predictions are reallocated on the basis of lowest costs. The estimate of the vector with the lowest cost is associated with all the remaining stored vectors (k-j).

While certain embodiments of the invention have been described it will be apparent that the invention can be put into practice in many other ways; for example other algorithms for near-maximum-likelihood detection (including maximum-likelihood detection) and estimation may be used, provided a plurality of estimates are determined at each sample interval and used in the detection process. The invention may also be applied to many other types of communication channel than those used in mobile cellular radio and HF radio links.

I claim:

1. A method of detection of signals at a receiver following transmission of symbols from at least one transmitter comprising the steps carried out for each of a succession of sample instants, of:

receiving a digital sample representative of at least one of said symbols from a communication channel between the transmitter and the receiver, forming a plurality of different predictions of the effect of the channel on said symbols, each prediction being derived from the digital sample at that instant, and using the predictions to carry out near-maximum likelihood detection of said digital sample received in one of said sample instants.

* * * * *